US009736798B2

(12) United States Patent
Sorrentino et al.

(10) Patent No.: US 9,736,798 B2
(45) Date of Patent: Aug. 15, 2017

(54) SIGNAL QUALITY MEASUREMENT FOR DEVICE-TO-DEVICE COMMUNICATION (71) Applicant: Telefonaktiebolaget L M Ericsson (publ), Stockholm (SE)

(72) Inventors: Stefano Sorrentino, Solna (SE); Xinghua Song, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/893,135

(22) PCT Filed: Oct. 9, 2015

(86) PCT No.: PCT/SE2015/051076
§ 371 (c)(1),
(2) Date: Nov. 23, 2015

(87) PCT Pub. No.: WO2016/056993
PCT Pub. Date: Apr. 14, 2016

(65) Prior Publication Data
US 2016/0204885 A1    Jul. 14, 2016

Related U.S. Application Data (60) Provisional application No. 62/062,551, filed on Oct. 10, 2014.

(51) Int. Cl.
*H04W 72/00* (2009.01)
*H04W 52/38* (2009.01)
(Continued)

(52) U.S. Cl.
CPC ........ *H04W 52/383* (2013.01); *H04B 17/318* (2015.01); *H04W 72/04* (2013.01); *H04W 76/023* (2013.01); *H04W 52/16* (2013.01)

(58) Field of Classification Search
CPC ........... H04W 56/0025; H04W 52/383; H04W 72/04; H04W 76/023; H04W 52/16; H04B 17/318
See application file for complete search history.

(56) References Cited

U.S. PATENT DOCUMENTS 5,285,200 A * 2/1994 Kuriyama ............ G06Q 20/341
235/380
8,630,197 B2 * 1/2014 Chu ....................... H04W 28/06
370/252

(Continued)

OTHER PUBLICATIONS

PCT Written Opinion of the International Searching Authority for International application No. PCT/SE2015/051076—Apr. 4, 2016.

(Continued)

*Primary Examiner* — Edward Urban
*Assistant Examiner* — Max Mathew
(74) *Attorney, Agent, or Firm* — Baker Botts, LLP (57) ABSTRACT According to some embodiments, a method in a wireless device comprises measuring power of a Device-to-Device (D2D) signal used by the wireless device for D2D operation; determining a power difference between the measured power of the D2D signal and a physical Device-to-Device Synchronization Signal (D2DSS); estimating power of a D2DSS using the measured power of the D2D signal and the determined power difference; and performing a D2D operation using the estimated power of the D2DSS.

20 Claims, 5 Drawing Sheets (51) Int. Cl.
  *H04W 72/04* (2009.01)
  *H04W 76/02* (2009.01)
  *H04B 17/318* (2015.01)
  *H04W 52/16* (2009.01)

(56) References Cited

U.S. PATENT DOCUMENTS

| | | | | |
|---|---|---|---|---|
| 2002/0065043 A1* | 5/2002 | Hamada | H04W 28/06 | 455/41.3 |
| 2005/0053037 A1* | 3/2005 | Ginzburg | H04L 1/0002 | 370/333 |
| 2006/0109814 A1* | 5/2006 | Kuzminskiy | H04B 7/0408 | 370/329 |
| 2008/0037482 A1* | 2/2008 | Douglas | H04L 43/08 | 370/338 |
| 2010/0309831 A1* | 12/2010 | Yeh | H04W 52/0216 | 370/311 |
| 2011/0032832 A1* | 2/2011 | Jalali | H04L 47/10 | 370/252 |
| 2012/0039391 A1* | 2/2012 | Frusina | H04L 47/25 | 375/240.07 |
| 2015/0071334 A1* | 3/2015 | Chini | H04B 1/10 | 375/219 |
| 2015/0245383 A1* | 8/2015 | Seo | H04W 76/023 | 370/336 |
| 2015/0312855 A1* | 10/2015 | Razaghi | H04W 52/0216 | 370/311 |
| 2015/0327193 A1* | 11/2015 | Yu | H04W 56/001 | 370/350 |
| 2015/0358894 A1* | 12/2015 | Berggren | H04W 48/16 | 455/434 |
| 2015/0358907 A1* | 12/2015 | Berggren | H04W 52/0229 | 455/574 |
| 2016/0095074 A1* | 3/2016 | Park | H04W 8/005 | 370/350 |
| 2016/0174179 A1* | 6/2016 | Seo | H04W 76/023 | 370/350 |
| 2016/0183276 A1* | 6/2016 | Marinier | H04W 72/02 | 370/329 |
| 2016/0212721 A1* | 7/2016 | Sheng | H04W 48/16 | |
| 2016/0227496 A1* | 8/2016 | Panteleev | H04L 5/0032 | |
| 2016/0255597 A1* | 9/2016 | Zhao | H04W 52/322 | |

OTHER PUBLICATIONS

PCT International Search Report for International application No. PCT/SE2015/051076—Mar. 29, 2016.

3GPP TSG RAN WG1 #78; Dresden, Germany; Source: Samsung; Title: Resource allocation for synchronization signal to assist D2D discovery/communication in asynchronous network (R1-143097)—Aug. 18-22, 2014.

PCT Notification of Transmittal of the International Search Report and the Written Opinion of the International Searching Authority, or the Declaration for International application No. PCT/SE2015/051076—Apr. 5, 2016.

3GPP TSG RAN WG1 Meeting #79; San Francisco, USA; Source: Ericsson; Title: D2DSS Based Measurements (R1-145149)—Nov. 17-21, 2014.

3GPP TSG RAN WG1 Meeting #77; Seoul, Korea; Source: Kuawei, HiSilicon; Title: D2D synchronization procedure for out-of-coverage (R1-141925)—May 19-23, 2014.

3GPP TSG RAN WG1 Meeting #78bis; Ljubljana, Slovenia; Source: Huawei, HiSilicon; Title: Conditions for D2DSS transmission in-and out-of coverage (R1-143700)—Oct. 6-10, 2014.

3GPP TSG RAN WG1 Meeting #78; Dresden, Germany; Source: Huawei, HiSilicon; Title: D2D synchronization procedure for out-of-coverage (R1-142845)—Aug. 18-22, 2014.

Office Action issued by the Government of the People's Republic of Bangladesh/Department of Patents, Designs & Trademarks, Ministry of Industries for Patent Application No. 262/2015—Oct. 16, 2016.

* cited by examiner

SIGNAL QUALITY MEASUREMENT FOR DEVICE-TO-DEVICE COMMUNICATION

PRIORITY

This nonprovisional application is a U.S. National Stage Filing under 35 U.S.C. §371 of International Patent Application Serial No. PCT/SE2015/051076 filed Oct. 9, 2015, and entitled "Signal Quality Measurement For Device-To-Device Communication" which claims priority to U.S. Provisional Patent Application No. 62/062,551 filed Oct. 10, 2014, both of which are hereby incorporated by reference in their entirety.

TECHNICAL FIELD

Particular embodiments relate generally to device-to-device (D2D) communication in wireless communications networks, and more particularly to signal quality measurement used for D2D communication and discovery.

BACKGROUND

Device-to-device communication (D2D) is a component of existing wireless technologies, including ad hoc and cellular networks. Examples include Bluetooth and several variants of the IEEE 802.11 standards suite such as WiFi Direct. These systems typically operate in unlicensed spectrum. D2D communications may also operate as an underlay to cellular networks as a means to take advantage of the proximity of communicating devices and at the same time to allow devices to operate in a controlled interference environment. Such device-to-device communication may share the same spectrum as the cellular system by, for example, reserving some of the cellular uplink resources for device-to-device purposes. Allocating dedicated spectrum for device-to-device purposes, however, is not a desirable solution as spectrum is a scarce resource. Dynamic spectrum sharing between the device-to-device services and cellular services provides flexibility and higher spectrum efficiency.

D2D communication may offer a variety of services to peer devices. Some non-limiting examples of such services include public safety and disaster relief (also known as national security and public safety (NSPS)), relaying function for coverage extension, proximity based social networking, cooperative positioning, and so on. D2D applications may include direct discovery and direct communication. In both cases, a transmitter sends D2D signals that are directly received at least by the intended receivers. D2D devices may operate in multi-carrier scenarios where cellular and/or D2D is configured to operate on multiple carriers. Such carriers do not necessarily belong to a single operator and are not necessarily coordinated and synchronized. D2D devices may operate on a carrier that is not the carrier of the device's serving cell.

D2D devices may use a D2D discovery process in which the device may advertise its capabilities and/or search for other devices capable of D2D communication. Signal quality measurement may be used for D2D communication and discovery. For example, signal quality measurements may be used to select synchronization signals.

D2D communication may refer to direct communication between devices. D2D devices operate within a radio access network. In cellular network assisted device-to-device communications (also called D2D communications as a cellular underlay), user equipment (UE) in the vicinity of each other can establish a direct radio link (D2D bearer). While UEs communicate over the D2D "direct" bearer, they also maintain a cellular connection with their respective serving base station (eNB).

In this way the cellular radio access network (RAN) can assist and supervise the UEs in allocating time, frequency, and code resources for the D2D bearer. Also, the cellular network may determine whether the D2D pair should use the direct link or communication should take place via the eNB. The network may also set the maximum power level that the D2D pair may use for the D2D bearer. Thus, network assisted D2D communications may take advantage of the short distances between devices and reuse cellular spectrum while at the same time protecting the cellular layer from potentially harmful interference caused by the D2D link.

Before establishing D2D communications, a D2D device may detect nearby devices capable of D2D communication. D2D devices may transmit discovery signals that may be detected by other D2D devices.

D2D communication may operate in multicarrier or carrier aggregation (CA) networks. In multicarrier or carrier aggregation networks, the UE is able to receive and/or transmit data to more than one serving cell (i.e., a CA capable UE may operate with more than one serving cell).

The carrier of each serving cell may be referred to as a component carrier (CC). A component carrier generally refers to an individual carrier in a multi-carrier system. Carrier aggregation may also be referred to as "multi-carrier system", "multi-cell operation", "multi-carrier operation", or "multi-carrier" transmission and/or reception.

Carrier aggregation may transmit signaling and data in both the uplink (UL) and downlink (DL) directions. One of the component carriers is the primary component carrier (PCC) (also referred to as primary carrier or anchor carrier). The remaining carriers are called secondary component carriers (SCC) (also referred to as secondary carriers or supplementary carriers). The serving cell may be interchangeably referred to as primary cell (PCell) or primary serving cell (PSC). Similarly, the secondary serving cell may be interchangeably referred to the as secondary cell (SCell) or secondary serving cell (SSC).

Generally, the primary or anchor component carrier carries the essential UE specific signaling. In carrier aggregation, the primary component carrier (e.g., PCC or PCell) exists in both uplink and downlink directions. In a scenario with a single uplink component carrier, the single uplink is the PCell. The network may assign different primary carriers to different UEs operating in the same sector or cell.

The serving radio network node (e.g., eNodeB in LTE) may use a configuration procedure to configure a carrier aggregation UE with one or more SCells (DL SCell, UL SCell, or both). The eNodeB may use a de-configuration procedure to de-configure or remove one or more already configured SCells (DL SCell, UL SCell, or both). The configuration or de-configuration procedure may also be used to change the current multi-carrier configuration (e.g., for increasing or decreasing the number of SCells or for swapping the existing SCells with new ones).

D2D UEs transmit D2D signals or channels in the uplink part of the spectrum. A D2D UE may operate in a half-duplex mode (i.e., the UE can either transmit D2D signals/channels or receive D2D signals/channels). D2D relay UEs may relay some signals to other D2D UEs. D2D signals may include control information, some of which is transmitted by D2D UEs and some of which is transmitted by eNodeBs (e.g., D2D resource grants for D2D communication may be transmitted via cellular downlink control channels). D2D transmissions may occur on resources which are configured by the network or selected autonomously by the D2D UE.

D2D communication refers to transmitting, by a D2D transmitter, D2D data and D2D control information with scheduling assignments (SAs) to assist D2D receivers of the D2D data. D2D data may be transmitted according to configured patterns and may be transmitted relatively frequently. Scheduling assignments may be transmitted periodically. In some examples of operation, D2D transmitters that are within the network coverage may request eNodeB resources for their D2D communication transmissions and receive in response D2D resource grants for scheduling assignments and D2D data. In other examples of operation, an eNodeB may broadcast D2D resource pools for D2D communication.

D2D discovery messages may be transmitted in relatively infrequent periodic subframes. An eNodeB may broadcast D2D resource pools for D2D discovery, both for reception and transmission.

Power control is a consideration for D2D communication. In LTE, uplink power control is specified. To enable uplink power control operation, a UE may be configured with one or more parameters. For example, the UE may derive path loss (PL) based on cell reference signal (CRS) power and reference signal receive power (RSRP) measurement on a serving cell in which it operates.

A carrier aggregation UE may independently perform power control in each serving cell (i.e., PCell and SCell(s)) for different control channels. Path loss may be derived based on RSRP of the downlink serving cell (i.e., DL CC), which is linked to an uplink serving cell (i.e., UL CC) for which the power control is performed. The linkage between the downlink and uplink carriers may be signaled to the UE by a higher layer.

D2D Synchronization Signals (D2DSS) may be used for D2D communication and discovery. A D2D wireless device may transmit D2DSS in D2DSS resources configured by an eNB. The D2D resources may include a periodically occurring subframe in which a D2D wireless device may transmit D2DSS if certain conditions are satisfied.

As a particular example, an in-coverage UE may transmit D2DSS in a D2DSS resource if either of the following conditions are satisfied: (a) if the subframe is within the SA or D2D data period in which SA or data is transmitted, the UE is RRC_Connected, and the eNB has instructed the UE (e.g., by dedicated signaling) to start D2DSS transmission; or (b) if a RSRP threshold for communicating D2DSS transmission is configured, the RSRP value of the UE is less than the threshold, and the eNB has not instructed the UE (e.g., by dedicated signaling) to stop D2DSS transmission. A D2DSS may also be referred to as a sidelink synchronization signal (SLSS). An SA may also be referred to as Physical Sidelink Control Channel (PSCCH).

A D2D UE may perform D2DSS signal quality measurement for synchronization determination, link adaption, power control and/or other Radio Resource Management (RRM) or Radio Link Monitoring (RLM) functionalities. As described above, however, D2DSS may only be transmitted by a particular group of UEs which meet particular conditions. Thus, reliance on D2DSS measurements may be difficult when the D2DSS may not always be present. For example, a D2D UE may not be able to obtain accurate measurements if sufficient D2DSS measurement samples cannot be obtained.

SUMMARY

According to some embodiments, a method in a wireless device comprises measuring power of a Device-to-Device (D2D) signal used by the wireless device for D2D operation; determining a power difference between the measured power of the D2D signal and a physical Device-to-Device Synchronization Signal (D2DSS); estimating power of a D2DSS using the measured power of the D2D signal and the determined power difference; and performing a D2D operation using the estimated power of the D2DSS.

In particular embodiments the D2D signal comprises a signal of a Physical Device-to-Device Shared Channel (PD2DSCH), such as a Demodulation Reference Signal (DMRS) or a physical resource. The D2D signal may comprise a DMRS or physical resource for a Scheduling Assignment (SA) or a DMRS for a D2D data transmission. Particular embodiments further comprise disabling open-loop power control for the SA and the D2D data transmission.

In particular embodiments, determining a power difference between the measured power of the D2D signal and the D2DSS comprises determining a power difference between a DMRS for a PD2DSCH and the physical D2DSS.

According to some embodiments, a method in a wireless device comprises identifying a set of wireless devices performing Device-to-Device (D2D) data communication or D2D discovery; identifying a set of Device-to-Device Synchronization Signals (D2DSS) transmitted by the identified wireless devices performing D2D data communication or D2D discovery; measuring power of a D2DSS from the identified set of D2DSS; and performing a D2D operation using the measured power of the D2DSS.

In some embodiments, identifying a set of wireless devices performing D2D data communication or D2D discovery comprises measuring a power level of a plurality of Device-to-Device Shared Channel (D2DSCH) resources, and determining, using the measured power level of the plurality of D2DSCH resources, whether a wireless device associated with each of the plurality of D2DSCH resources is performing D2D data communication or D2D discovery. In addition, identifying a set of D2DSS transmitted by the identified wireless devices performing D2D data communication or D2D discovery comprises identifying a D2DSS paired with each of the PD2DSCH determined to be associated with a wireless device performing D2D data communication or D2D discovery. In some embodiments identifying a set of wireless devices performing D2D data communication or D2D discovery comprises measuring a power level of a plurality of D2DSS resources, and determining, using a statistical distribution of the measured power level of the plurality of D2DSS resources, whether a wireless device associated with each of the plurality of D2DSS resources is performing D2D data communication or D2D discovery.

Also disclosed is a computer program product. The computer program product comprises instructions stored on non-transient computer-readable media which, when executed by a processor, perform the acts of measuring power of a Device-to-Device (D2D) signal used by the wireless device for D2D operation; determining a power difference between the measured power of the D2D signal and a physical Device-to-Device Synchronization Signal (D2DSS); estimating power of a D2DSS using the measured power of the D2D signal and the determined power difference; and performing a D2D operation using the estimated power of the D2DSS.

Another computer program product comprises instructions stored on non-transient computer-readable media which, when executed by a processor, perform the acts of identifying a set of wireless devices performing Device-to- Device (D2D) data communication or D2D discovery; identifying a set of Device-to-Device Synchronization Signals (D2DSS) transmitted by the identified wireless devices performing D2D data communication or D2D discovery; measuring power of a D2DSS from the identified set of D2DSS; and performing a D2D operation using the measured power of the D2DSS.

Particular embodiments may exhibit some of the following technical advantages. In some embodiments, signal quality measurement may be used for D2D communication and discovery. Particular embodiments disclose efficient and accurate methods of obtaining measurements that enable a UE to determine link adaptation, power control, or other RRM/RLM functionalities. Particular embodiments disclose combining measurements on a plurality of signals with a known power relationship to improve measurement on at least one of the plurality of signals. Other technical advantages will be readily apparent to one skilled in the art from the following figures, description and claims.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

As described above, at any given time only a particular group of wireless devices that meet particular conditions may be transmitting D2DSS. Thus, for a wireless device attempting D2D operations, reliance on D2DSS measurements may be difficult when the D2DSS may not always be present. An object of the present disclosure is to obviate at least these disadvantages and provide measurements on a plurality of signals with a known power relationship to each other to improve measurement on at least one of the plurality of signals.

Particular embodiments are described with reference to FIGS. 1-5 of the drawings, like numerals being used for like and corresponding parts of the various drawings. LTE is used throughout this disclosure as an example cellular system, but the ideas presented herein apply to other wireless communication systems as well.

Figure 1:
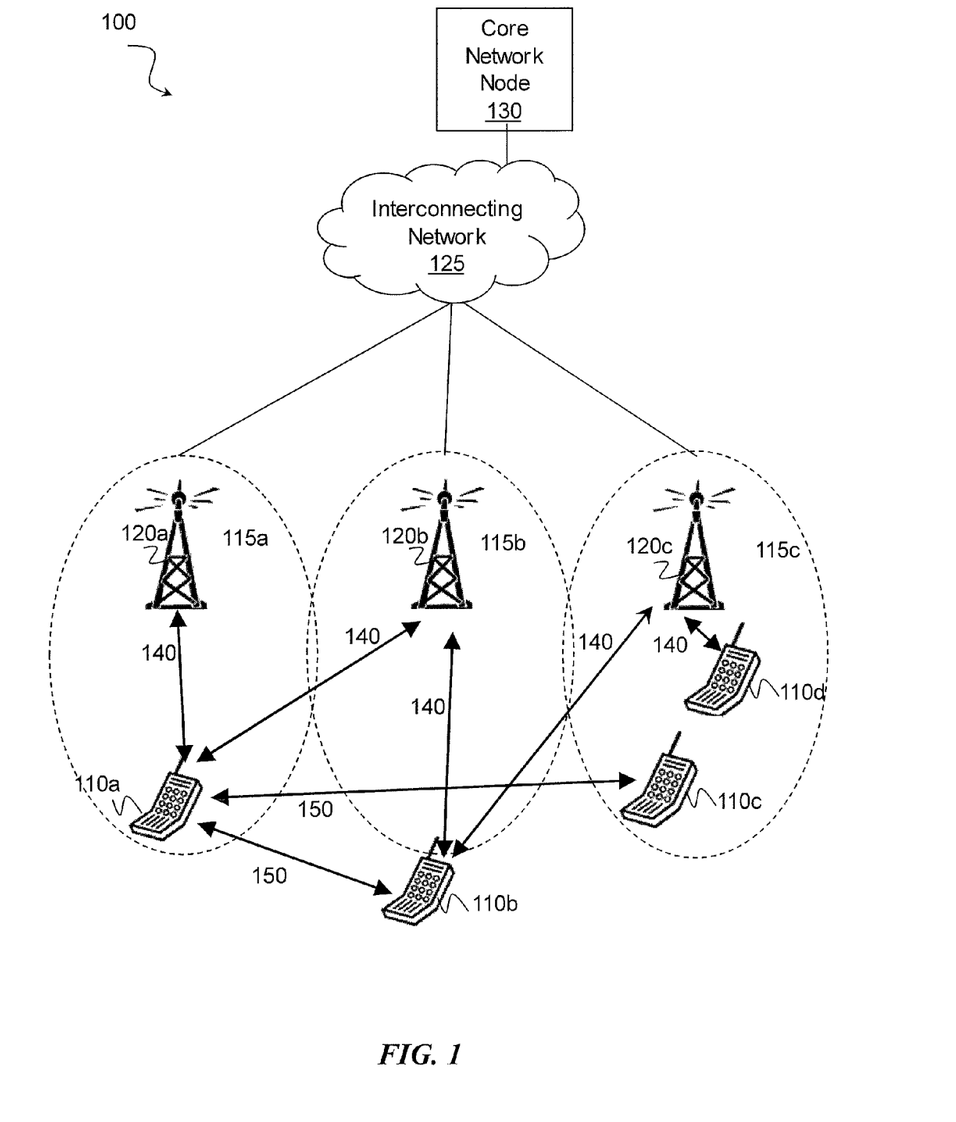
FIG. 1 is a block diagram illustrating an example wireless network, according to a particular embodiment.

FIG. 1 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of radio network nodes. The network nodes include network nodes 120 (such as base stations or eNodeBs), and a core network node 130. Radio network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 140. For example, wireless devices 110 and radio network node 120 may communicate wireless signals 140 containing voice traffic, data traffic, and/or control signals. A network node 120 communicating voice traffic, data traffic, and/or control signals to wireless device 110 may be referred to as a serving network node 120 for the wireless device 110.

Wireless signals 140 may include both downlink transmissions (from radio network node 120 to wireless devices 110) and uplink transmissions (from wireless devices 110 to radio network node 120). Wireless signals 140 may include broadcast information such as system information (transmitted in system information blocks (SIBs)). Wireless signals 140 may include reference signals. Wireless device 110 may detect reference signals to perform channel estimation, data demodulation, power control, etc.

Particular embodiments are applicable to single carrier, to multicarrier, or to carrier aggregation systems. As an example of carrier aggregation, network node 120a may be the network node of the primary serving cell for wireless device 110a and network node 120b may be the network node of the secondary serving cell for wireless device 110a. The primary serving cell and secondary serving cell may operate with different carrier frequencies.

Wireless devices 110 may communicate with each other (i.e., D2D operation) by transmitting and receiving wireless signals 150. For example, wireless device 110a may communicate with wireless device 110b using wireless signal 150. Wireless signal 150 may also be referred to as sidelink 150. In particular embodiments, wireless signal 150 may use a different carrier frequency than the carrier frequency of wireless signal 140. For example, wireless device 110a may communicate with network node 120a using a first frequency band. Wireless device 110b may communicate with network node 120b using a second frequency band. Wireless device 110a may communicate with wireless device 110b using a carrier in the first frequency band, the second frequency band, or any other suitable frequency band available to wireless devices 110a and 110b.

Wireless signals 150 may include discovery and reference signals. For example, in particular embodiments wireless signal 150 may include a synchronization channel such as Physical D2D Synchronization Channel (PD2DSCH) (also referred to as PSBCH) and a D2D synchronization signal (D2DSS) (also referred to as SLSS), a discovery channel (also referred to as PSDCH), a data channel (also referred to as PSSCH), and a scheduling assignment or control channel (also referred to as PSCCH).

Core network node 130 manages the establishment of communication sessions and various other functionality for wireless communication devices 110 within coverage (or partial coverage) of the wireless network. The network nodes connect through interconnecting network 125, which refers to any interconnecting system capable of transmitting audio, video, signals, data, messages, or any combination of the preceding.

Each network node 120 may have a single transmitter or multiple transmitters for transmitting signals 140 to wireless devices 110. In some embodiments, network node 120 may comprise a multi-input multi-output (MIMO) system. Similarly, each wireless device 110 may have a single receiver or multiple receivers for receiving signals 140 from network nodes 120.

In wireless network 100, each radio network node 120 may use any suitable radio access technology, such as long term evolution (LTE), LTE-Advanced, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 4A below. Similarly, a network node may include any suitable combination of hardware and/or software. For example, in particular embodiments, a network node, such as network node 120, may include the components described with respect to FIG. 5 below.

In particular embodiments, a D2D wireless device capable of D2D communication, discovery, or both may measure signal quality based on D2DSS transmission in D2DSS resources. Such measurements may be used for various purposes, such as obtaining an RSRP or any other signal quality or strength related measurements. A wireless device may define particular behaviors as a function of such measurements. For example, a UE may select a synchronization source from a set of candidate synchronization sources based at least on a synchronization signal quality associated with each of the sources. As another example, such measurements may be used to determine whether a UE should transmit synchronization signals. As another example, such measurements may be used to determine whether a UE should not synchronize to an external synchronization source. As another example, such measurements may be used to determine whether a UE is in radio coverage of another device.

In LTE, a synchronization resource is defined as a periodic sequence of radio resources where devices are allowed to transmit synchronization signals. Different devices or sets of devices may transmit on each instance of the synchronization resource according to certain rules and periodicities that may be known to the network node. For example, wireless devices participating in different services (e.g., discovery, communication) as well as wireless devices in different coverage states (e.g., in-coverage, out-of-coverage, under-coverage of Physical D2D Synchronization Channel (PD2DSCH), etc.) may use different time instances from the synchronization resource to transmit D2DSS. At a given time instance, the discovery resource may carry a signal that is the combination of synchronization signals transmitted by multiple wireless devices. Such signals may be undistinguishable from each other (e.g., if the devices transmit the same sequence).

Similar considerations hold for PD2DSCH, which is also transmitted on periodic radio sequences according to certain rules. Therefore, the set of wireless devices transmitting PD2DSCH varies over time within the PD2DSCH resource. As an example of such a rule, if a UE participating in communication transmits D2DSS, then the UE should also transmit PD2DSCH on a resource paired to D2DSS. As another example, if a UE participating in discovery and not participating in communication transmits D2DSS, then the UE should not transmit PD2DSCH. Particular embodiments may include additional rules. For example, embodiments may include rules for differentiating the transmission resources of in-coverage and out-of-coverage wireless devices. A PD2DSCH may also be referred to as a Physical Sidelink Broadcast Channel (PSBCH).

In particular embodiments, for certain D2DSS measurements a D2D wireless device may only be interested in determining a measurement associated with a received D2DSS power (or any other metric) associated with UEs participating in a communication. In particular embodiments, similar measurements may be associated with different groups of wireless devices. Because the time instances used by devices participating in D2D communication may be unknown to the receiver, it may not be possible for the receiver to accurately determine the measurement of the power used by wireless devices participating in the D2D communication. The receiver may not know which time instances of D2DSS should be used for a measurement process.

In particular embodiments, wireless devices participating in D2D communication may transmit a D2DSS and a PD2DSCH signal/channel. Wireless devices participating in discovery may transmit D2DSS but not PD2DSCH. A PD2DSCH includes data symbols and reference symbols. In particular embodiments, the transmission power of PD2DSCH may be linked to the transmission power of D2DSS (or at least one of the symbols in D2DSS) according to a known rule.

Particular embodiments may be implemented in a network node (e.g., serving eNB) and other embodiments may be implemented in a wireless device (e.g., UE). Particular embodiments may be combined with each other. Network node embodiments include the following example embodiments.

In particular embodiments, a network node may configure D2DSS transmission in all D2DSS resources (e.g., set the RSRP threshold to −infinity) by reading SIB information that indicates a configuration of D2DSS transmission criteria. A D2D wireless device may know that D2DSS will be transmitted in all D2DSS resources and that signal quality measurement may be performed in all D2DSS resources.

For example, with respect to FIG. 1, network node 120c may configure wireless devices 110c and 100d with an RSRP threshold of −infinity. This may cause wireless devices 110c and 100d to transmit D2DSS. Wireless devices 110c, 110d, and any other wireless devices served by network node 120c know that D2DSS is being transmitted in all D2DSS resources and may perform measurements in all D2DSS resources.

In some embodiments, a network node may not configure D2DSS transmission in any D2DSS resources (e.g., set the RSRP threshold to infinity) by reading SIB information that indicates a configuration of D2DSS transmission criteria. A D2D UE may know that D2DSS may not be transmitted in any D2DSS resource and that signal quality measurement may not be performed in any of the D2DSS resources. In this example embodiment, the UE may rely on the measurement of other D2D signals/channels.

For example, network node 120c may configure wireless devices 110c and 100d with an RSRP threshold of infinity. This may cause wireless devices 110c and 100d not to transmit D2DSS. Wireless devices 110c, 110d, and any other wireless devices served by network node 120c know that D2DSS is not being transmitted in any D2DSS resources and that measurements should be performed on signals other than a D2DSS.

Particular embodiments may be implemented in a wireless device (e.g., UE). Wireless device embodiments include the following example embodiments.

In particular embodiments, measurement of a D2DSS signal transmitted by a subset of UEs transmitting D2DSS may be aided by use of other measurements on another signal (e.g., PD2DSCH) that is transmitted only by the subset of wireless devices of interest. Such additional measurements may replace or be combined in any way with the measurements on D2DSS. For example, in some embodiments a wireless device may measure a D2DSS signal power based on demodulation reference signals (DMRS), or any other suitable symbol, of PD2DSCH. The power differences between the DMRS for PD2DSCH and the physical D2DSS may be known to the receiver and may be compensated for when estimating the D2DSS power based on PD2DSCH.

In particular embodiments, a wireless device may measure a D2DSS signal power based on power measurements on PD2DSCH (also known as PSBCH) physical resources. The power differences between the DMRS for PD2DSCH and the physical D2DSS may be known to the receiver and may be compensated for when estimating the D2DSS power based on PD2DSCH. In particular embodiments, the wireless device may perform the measurement based on DMRS for SA or D2D data transmissions. In this example embodiment, the open-loop power control for SA or D2D data may not be enabled (e.g., the pathloss compensation factor is set to zero).

In particular embodiments, a wireless device may measure signal quality based on SA, data, or both physical resources. In this example embodiment, the power differences between SA, D2D data and the physical D2DSS may not be enabled (e.g., the pathloss compensation factor is set to zero).

These embodiments provide advantages to a wireless device by facilitating estimation of a particular D2DSS signal even when the D2DSS signal is weak or unavailable. By measuring signals associated with a particular D2DSS, the wireless device is able to estimate a particular D2DSS and perform D2D operations using the estimated signal. In some embodiments, the wireless device may combine estimated and actual measurements for a D2DSS.

In particular embodiments, a wireless device may detect PD2DSCH resources to identify paired resources used for D2DSS transmission by communication and discovery wireless devices. PD2DSCH detection may be performed, for example, by blind detection or energy measurements. After a wireless device identifies D2DSS instances of interest based on PD2DSCH detection, the wireless device may perform measurement on the D2DSS resources.

In particular embodiments, a wireless device may detect PD2DSCH resources to identify paired resources used for D2DSS transmission by communication and discovery wireless devices. PD2DSCH detection may be performed, for example, by blind detection or energy measurements. By determining the power level of different time instances of PD2DSCH, the wireless device may determine which time instances of D2DSS are used by communication wireless devices and which ones are used by discovery wireless devices (or by both groups of wireless devices).

For example, with respect to FIG. 1, wireless device 110c may be D2D communicating with wireless device 110a. In this example, wireless device 110c is a communicating wireless device. Wireless device 110d may be performing discovery. In this example, wireless device 110d is a discovery wireless device. Wireless device 110b may determine the power level of the different time instances of PD2DSCH corresponding to wireless devices 110c and 110d. Based on the determined power levels, wireless device 110b may determine that wireless device 110c is a communicating wireless device and that wireless device 110d is a discovery wireless device. Wireless device 110b may determine that communicating wireless device 110c provides the strongest reference signals and may measure D2DSS and/or other reference signals transmitted from communicating wireless device 110c. Wireless device 110b may use the measured reference signals to determine that wireless device 110c is a suitable reference source.

In particular embodiments, a wireless device may measure the power of a D2DSS resource and, based on the statistical distribution of the D2DSS measurements, the wireless device may determine which D2DSS resources are used by communication wireless devices and which are used by discovery wireless devices (or by both groups of wireless devices). For example, a wireless device may detect two power levels of D2DSS. The first power level may be associated with D2DSS instances transmitted by discovery and communication wireless devices. The second power level may represent a lower power and may be associated with the transmission only by discovery wireless devices. After a wireless device identifies D2DSS instances of interest based on PD2DSCH detection, the wireless device may perform measurement on such D2DSS resources.

In particular embodiments, a wireless device capable of both communication and discovery may perform signal quality measurements based on the D2DSS resources for either communication or discovery, even if the functionality is not activated. For example, the wireless device capable of both communication and discovery may not be activated for discovery functionality, but it may perform signal quality measurement in the D2DSS resources used for discovery, or vice versa.

These embodiments provide advantages to a wireless device by facilitating estimation of a particular D2DSS signal even when the D2DSS signal is weak or unavailable. By measuring signals associated with a particular D2DSS, the wireless device is able to estimate a particular D2DSS and perform D2D operations using the estimated signal. Measuring signals associated with communicating or discovery wireless devices increases the probability that the measurements are of sufficient quality to accurately estimate the associated D2DSS.

Figure 2:
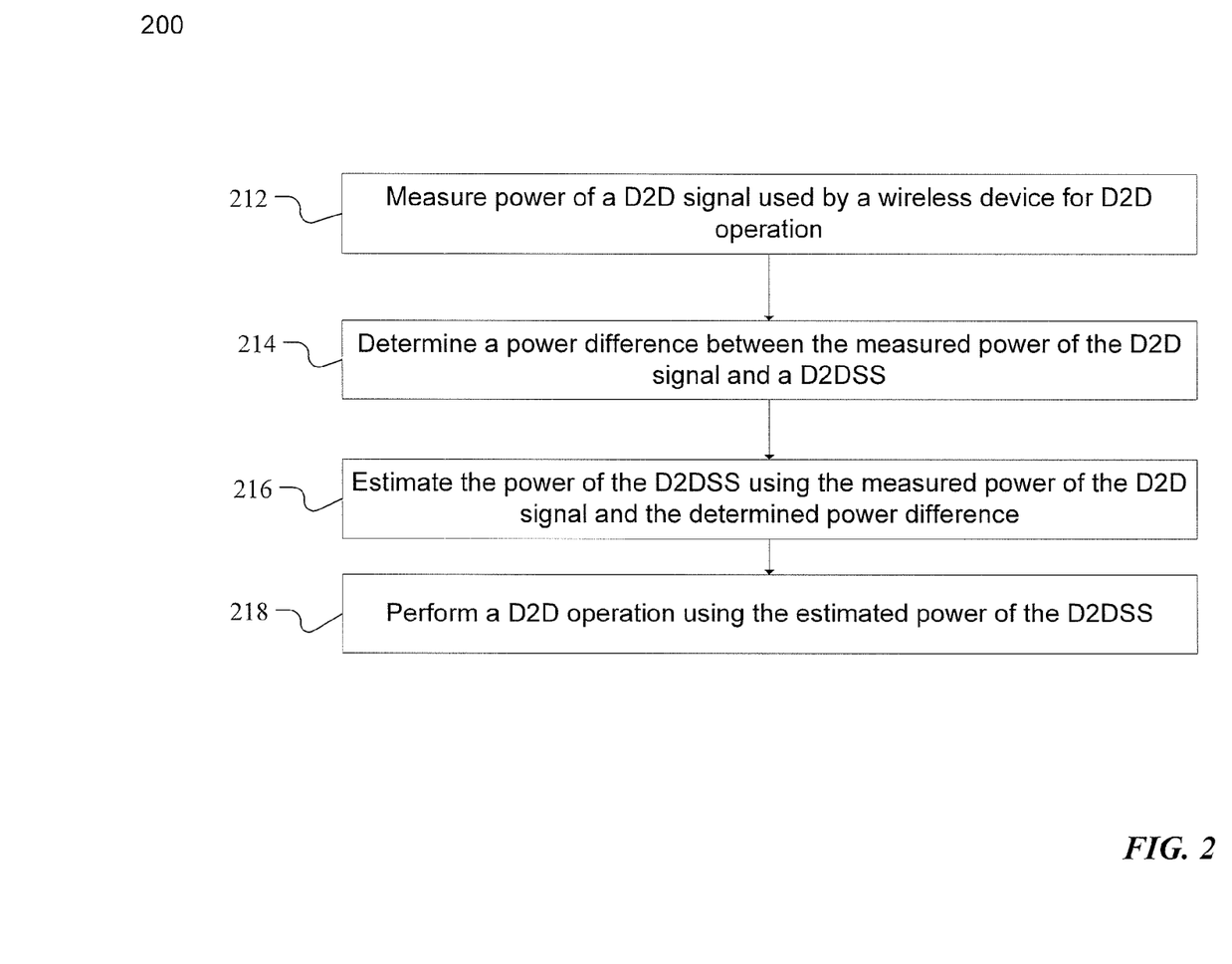
FIG. 2 is a flow diagram of a method in a wireless device of measuring a D2D signal for D2D operation, according to particular embodiments.

FIG. 2 is a flow diagram of a method in a wireless device of measuring a D2D signal for D2D operation, according to particular embodiments. In particular embodiments, one or more steps of method 200 may be performed by components of wireless network 100 described with reference to FIGS. 1-5.

The method begins at step 212 where the wireless device measures the power of a D2D signal used by a wireless device for D2D operation. For example, wireless device 110a may measure a DMRS of a PD2DSCH transmitted from wireless device 110b. In particular embodiments, wireless device 110a may measure any other suitable signal of the PD2DSCH, any suitable physical resources of the PD2DSCH, any signal associated with a SA or D2D data transmission, or any other suitable signal transmitted from wireless device 110b, or any other suitable wireless device.

At step 214, the wireless device determines a power difference between the measured power of the D2D signal and a D2DSS. For example, the power difference between a DMRS of a PD2DSCH and a D2DSS may be a known quantity. In particular embodiments, the power difference may be known to wireless device 110a. In some embodiments, network node 120a may signal the power difference to wireless device 110a. Similarly, the power difference may be known between a D2DSS and other reference signals, such as any other suitable signal of the PD2DSCH, any suitable physical resources of the PD2DSCH, any signal associated with a SA or D2D data transmission, or any other suitable signal transmitted from wireless device 110b, or any other suitable wireless device. In some embodiments, wireless device 110a may dynamically calculate the power difference.

At step 216, the wireless device estimates the power of the D2DSS using the measured power of the D2D signal and the determined power difference. For example, wireless device 110a knows the measured value of the DMRS of the PD2DSCH transmitted by wireless device 110b. Wireless device 110 also knows the power difference between the DMRS and the D2DSS. Using at least these two pieces of information, wireless device 110a may estimate the power of the D2DSS transmitted (or potentially would be transmitted) by wireless device 110b. In particular embodiments, similar estimations may be performed based on any of the other suitable reference signals described above.

At step 218, the wireless device performs a D2D operation using the estimated power of the D2DSS. For example, based on the estimated power of the D2DSS received from wireless device 110b, wireless device 110a may determine to use wireless device 110b as its synchronization source. As another example of D2D operation based on the estimated power of the D2DSS received from wireless device 110b, wireless device 110a may determine that it should transmit its own D2DSS, determine that it should not synchronize to any external source, determine whether it is in radio coverage of wireless device 110b, or any other suitable D2D operation.

Modifications, additions, or omissions may be made to method 200. Additionally, one or more steps in method 200 of FIG. 2 may be performed in parallel or in any suitable order.

Figure 3:
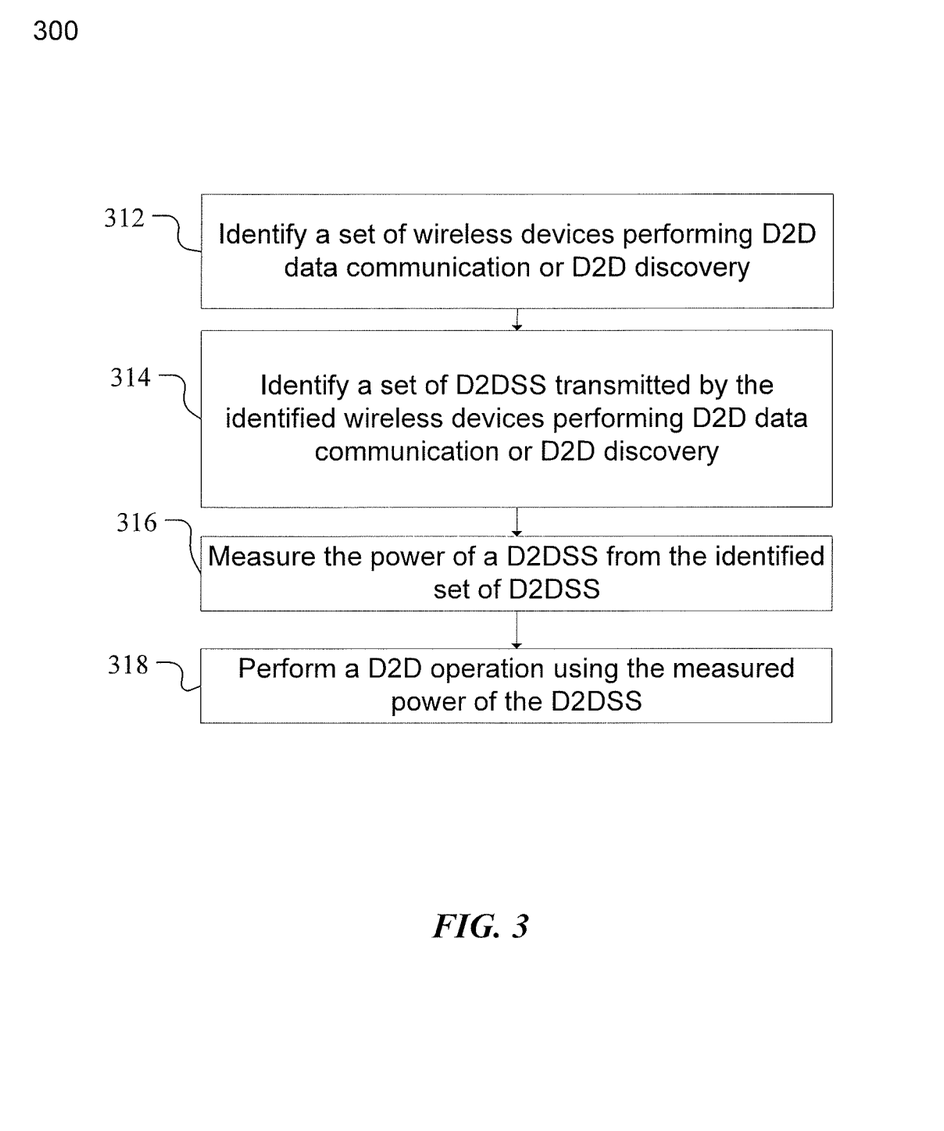
FIG. 3 is another flow diagram of a method in a wireless device of measuring a D2D signal for D2D operation, according to particular embodiments.

FIG. 3 is another flow diagram of a method in a wireless device of measuring a D2D signal for D2D operation, according to particular embodiments. In particular embodiments, one or more steps of method 300 may be performed by components of wireless network 100 described with reference to FIGS. 1-5.

The method begins at step 312 where the wireless device identifies a set of wireless devices performing D2D data communication or D2D discovery. For example, assume wireless devices 110a and 110b are both performing D2D data communications and wireless device 110d is performing D2D discovery. To identify the set of devices performing D2D data communications or D2D discovery, in particular embodiments wireless device 110c may perform at least one of blind detection or energy measurements.

In some embodiments, wireless device 110c may determine the power level for different time instances of PD2DSCH. For example, the highest power levels may be associated with communicating wireless devices 110a and 110b, and the next highest group of power levels may be associated with discovery wireless device 110d.

In some embodiments, wireless device 110c may determine which wireless devices are communicating wireless devices and which are discovery wireless devices based on a statistical distribution of D2DSS power levels. For example, the highest power levels may be associated with D2DSS of communicating wireless devices 110a and 100b, and the next highest group of power levels may be associated with the D2DSS of discovery wireless device 110d.

At step 314, the wireless device identifies a set of D2DSS transmitted by the identified wireless devices performing D2D data communication or D2D discovery. For example, in particular embodiments wireless device 110c identifies the set of communicating wireless devices 110a and 110b by measuring different time instances of PD2DSCH. Each time instance of PD2DSCH may be paired with a particular D2DSS. Based on this pairing, wireless device 110c can identify which D2DSS are transmitted by wireless devices 110a and 110b.

In some embodiments, wireless device 110c identifies the set of communicating wireless devices 110a and 110b based on a statistical distribution of D2DSS power levels. In these embodiments, wireless device already knows which D2DSS are associated with wireless devices 110a and 110b because the D2DSS were used in identifying the set to begin with.

At step 316, the wireless device measures the power of a D2DSS from the identified set of D2DSS. For example, wireless device 110c may measure the D2DSS of at least one of wireless device 110a and 110b. In some embodiments, the D2DSS transmitted from a particular wireless device may have been measured previously in steps 312 or 314 and that measurement may be used again in step 316 without performing the measurement again.

At step 318, the wireless device performs a D2D operation using the measured power of the D2DSS. For example, based on the estimated power of the D2DSS received from wireless device 110b, wireless device 110c may determine to use wireless device 110b as its synchronization source. As another example of D2D operation based on the estimated power of the D2DSS received from wireless device 110b, wireless device 110c may determine that it should transmit its own D2DSS, determine that it should not synchronize to any external source, determine whether it is in radio coverage of wireless device 110c, or any other suitable D2D operation.

Modifications, additions, or omissions may be made to method 300. Additionally, one or more steps in method 300 of FIG. 3 may be performed in parallel or in any suitable order.

Figure 4A:
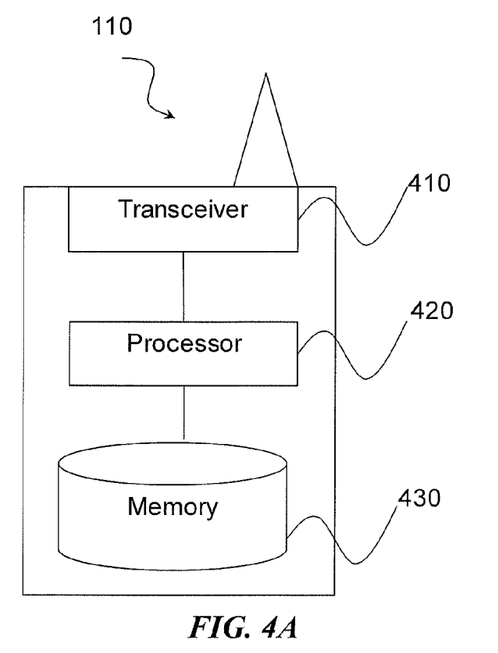
FIG. 4A is a block diagram illustrating an example embodiment of a wireless device.

FIG. 4A is a block diagram illustrating an example embodiment of a wireless device. The wireless device is an example of the wireless devices 110 illustrated in FIG. 1. Particular examples include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. The wireless device includes transceiver 410, processor 420, and memory 430. In some embodiments, transceiver 410 facilitates transmitting wireless signals to and receiving wireless signals from wireless network node 120 (e.g., via an antenna), processor 420 executes instructions to provide some or all of the functionality described herein as provided by the wireless device, and memory 430 stores the instructions executed by processor 420.

Processor 420 includes any suitable combination of hardware and software implemented in one or more integrated circuits or modules to execute instructions and manipulate data to perform some or all of the described functions of the wireless device. In some embodiments, processor 420 may include, for example, one or more computers, one more programmable logic devices, one or more central processing units (CPUs), one or more microprocessors, one or more applications, and/or other logic, and/or any suitable combination of the preceding. Processor 420 may include analog and/or digital circuitry configured to perform some or all of the described functions of wireless device 110. For example, processor 420 may include resistors, capacitors, inductors, transistors, diodes, and/or any other suitable circuit components.

Memory 430 is generally operable to store computer executable code and data. Examples of memory 430 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 420 in communication with transceiver 410 receives reference signals from radio network node 120 or other wireless devices 110. Other embodiments of the wireless device may include additional components (beyond those shown in FIG. 4A) responsible for providing certain aspects of the wireless device's functionality, including any of the functionality described above and/or any additional functionality (including any functionality necessary to support the solution described above).

Figure 4B:
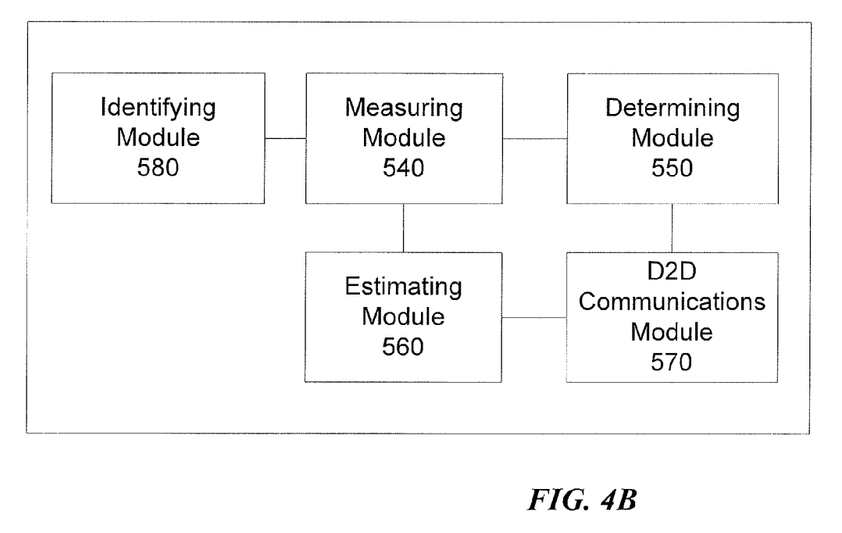
FIG. 4B is a block diagram illustrating example components of a wireless communication device.

FIG. 4B is a block diagram illustrating example components of a wireless communication device 110. The components may include a measuring module 540, a determining module 550, an estimating module 560, a D2D communications module 570, and an identifying module 580.

Measuring module 540 may perform the measuring functions of wireless device 110. For example, measuring module 540 may measure signals, such as reference signals, from other wireless devices 110. In certain embodiments, measuring module 540 may include or be included in processor 520. Measuring module 540 may include circuitry configured to measure radio signals. In particular embodiments, measuring module 540 may communicate measurements to determining module 550 and estimating module 560.

Determining module 550 may perform the processing functions of wireless device 110 related to determining a power difference between a measured signal and a D2DSS. In certain embodiments, determining module 550 may include or be included in processor 520. Determining module 550 may include analog and/or digital circuitry configured to perform any of the functions of determining module 550 and/or processor 520. In particular embodiments, determining module 550 may receive measurements from measuring module 540 and may communicate determinations to D2D communications module 570 and estimating module 560.

Estimating module 560 may perform estimating functions of wireless device 110 for estimating a D2DSS. In certain embodiments, estimating module 560 may include or be included in processor 520. Estimating module 560 may include analog and/or digital circuitry configured to perform any of the functions of estimating module 560 and/or processor 520. In particular embodiments, estimating module 560 may receive measurements from measuring module 540 and may communicate estimates to D2D communications module 570.

D2D communications module 570 may perform the D2D functions of wireless device 110 for communicating with another wireless device 110. In certain embodiments, D2D communications module 570 may include or be included in processor 520. D2D communications module 570 may include analog and/or digital circuitry configured to perform any of the functions of D2D communications module 570 and/or processor 520. In particular embodiments, D2D communications module 570 may perform D2D communication on the uplink carrier such as data communication, discovery, synchronization, and power control. In particular embodiments, D2D communications module 570 may receive information from estimating module 560 and/or determining module 550.

Identifying module 580 may perform the functions of wireless device 110 for identifying other wireless devices 110 that may be performing D2D communications or D2D discovery. Identifying module 580 may also identify a set of D2DSS transmitted by the identified wireless devices performing D2D data communication or D2D discovery. In certain embodiments, identifying module 580 may include or be included in processor 520. Identifying module 580 may include analog and/or digital circuitry configured to perform any of the functions of identifying module 580 and/or processor 520. In particular embodiments, identifying module 580 may communicate information to measuring module 540.

Figure 5:
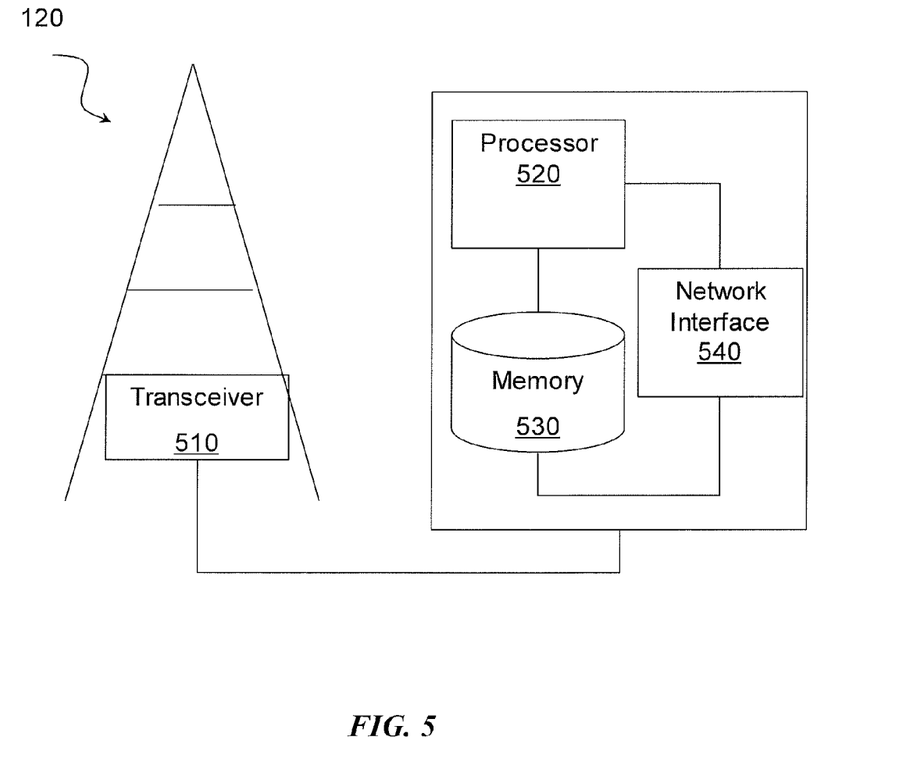
FIG. 5 is a block diagram illustrating an example embodiment of a network node.

FIG. 5 is a block diagram illustrating an example embodiment of a network node. Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes at least one transceiver 510, at least one processor 520, at least one memory 530, and at least one network interface 540. Transceiver 510 facilitates transmitting wireless signals to and receiving wireless signals from a wireless device, such as wireless devices 110 (e.g., via an antenna); processor 520 executes instructions to provide some or all of the functionality described above as being provided by a network node 120; memory 530 stores the instructions executed by processor 520; and network interface 540 communicates signals to backend network components, such as a gateway, switch, router, Internet, Public Switched Telephone Network (PSTN), controller, and/or other network nodes 120. Processor 520 and memory 530 can be of the same types as described with respect to processor 420 and memory 430 of FIG. 4A above.

In some embodiments, network interface 540 is communicatively coupled to processor 520 and refers to any suitable device operable to receive input for network node 120, send output from network node 120, perform suitable processing of the input or output or both, communicate to other devices, or any combination of the preceding. Network interface 540 includes appropriate hardware (e.g., port, modem, network interface card, etc.) and software, including protocol conversion and data processing capabilities, to communicate through a network.

In particular embodiments, processor 520 in communication with transceiver 510 transmits, to wireless device 110, D2D configuration information. In particular embodiments, processor 520 in communication with transceiver 510 transmits D2D configuration information as described above to wireless device 110.

Other embodiments of network node 120 include additional components (beyond those shown in FIG. 5) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Some embodiments of the disclosure may provide one or more technical advantages. As an example, particular embodiments disclose efficient and accurate methods of obtaining measurements that enable a UE to determine link adaptation, power control, or other RRM/RLM functionalities. Particular embodiments disclose combining measurements on a plurality of signals with a known power relationship to improve measurement on at least one of the plurality of signals.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BTS Base Transceiver Station
CA Carrier Aggregation
CC Component Carrier
CRS Cell-specific Reference Signal
D2D Device-to-Device
D2DSCH Device-to-Device Shared Channel
D2DSS Device-to-Device Synchronization Signal
DL Downlink
DMRS Demodulation Reference Signal
eNB eNodeB
LTE Long Term Evolution
M2M Machine to Machine
MeNB Master eNodeB
NSPS National Security and Public Safety
PCC Primary Component Carrier
PCell Primary Cell
PD2DSCH Physical Device-to-Device Shared Channel
PSBCH Physical Sidelink Broadcast Channel
PSCell Primary SCell
PSBCH Physical Sidelink Discovery Channel
PSC Primary Serving Cell
PSCCH Physical Sidelink Control Channel
PSSCH Physical Sidelink Shared Channel
RAN Radio Access Network
RLM Radio Link Monitoring
RRC Radio Resource Control
RRH Remote Radio Head
RRM Radio Resource Management
RRU Remote Radio Unit
RSRP Reference Signal Received Power
SA Scheduling Assignment
SCC Secondary Component Carrier
SCell Secondary Cell
SeNB Secondary eNodeB
SIB System Information Block
SLSS Sidelink Synchronization Signal
SSC Secondary Serving Cell
UE User Equipment
UL Uplink
WAN Wireless Access Network

The invention claimed is:

1. A method in a wireless device, the method comprising:
measuring power of a Device-to-Device (D2D) signal used by the wireless device for D2D operation, wherein the D2D signal comprises a physical resource for a D2D control or data transmission other than a physical Device-to-Device Synchronization Signal (D2DSS);
determining a power difference between the measured power of the D2D signal and a physical D2DSS [Device to Device Synchronization (D2DSS)];
estimating power of a D2DSS using the measured power of the D2D signal and the determined power difference; and
performing a D2D operation using the estimated power of the D2DSS.

2. The method of claim 1, wherein the D2D signal comprises a signal of a Physical Device-to-Device Shared Channel (PD2DSCH).

3. The method of claim 2, wherein the signal of the PD2DSCH is a Demodulation Reference Signal (DMRS).

4. The method of claim 2, wherein the signal of the PD2DSCH is a physical resource.

5. The method of claim 1, wherein the D2D signal is a DMRS for a Scheduling Assignment (SA) or a DMRS for a D2D data transmission.

6. The method of claim 1, wherein the D2D signal is a physical resource for a SA or a physical resource for a D2D data transmission.

7. The method of claim 5, further comprising disabling open-loop power control for the SA and the D2D data transmission.

8. The method of claim 1, wherein determining a power difference between the measured power of the D2D signal and the D2DSS comprises determining a power difference between a DMRS for a PD2DSCH and the physical D2DSS.

9. A method in a wireless device, the method comprising:
identifying a set of wireless devices performing Device-to-Device (D2D) data communication or D2D discovery;
identifying a set of Device-to-Device Synchronization Signals (D2DSS) transmitted by the identified wireless devices performing D2D data communication or D2D discovery;

measuring power of a D2DSS from the identified set of D2DSS; and performing a D2D operation using the measured power of the D2DSS;

wherein:

identifying the set of wireless devices performing D2D data communication or D2D discovery comprises:

measuring a power level of a plurality of Device-to-Device Shared Channel (D2DSCH) resources; and determining, using the measured power level of the plurality of D2DSCH resources, whether a wireless device associated with each of the plurality of D2DSCH resources is performing D2D data communication or D2D discovery; and identifying the set of D2DSS transmitted by the identified wireless devices performing D2D data communication or D2D discovery comprises identifying a D2DSS paired with each of the PD2DSCH determined to be associated with a wireless device performing D2D data communication or D2D discovery.

10. A method in a wireless device, the method comprising:

identifying a set of wireless devices performing Device-to-Device (D2D) data communication or D2D discovery;

identifying a set of Device-to-Device Synchronization Signals (D2DSS) transmitted by the identified wireless devices performing D2D data communication or D2D discovery;

measuring power of a D2DSS from the identified set of D2DSS; and performing a D2D operation using the measured power of the D2DSS;

wherein:

identifying the set of wireless devices performing D2D data communication or D2D discovery comprises:

measuring a power level of a plurality of D2DSS resources; and determining, using a statistical distribution of the measured power level of the plurality of D2DSS resources, whether a wireless device associated with each of the plurality of D2DSS resources is performing D2D data communication or D2D discovery.

11. A wireless device comprising a processor operable to:

measure power of a Device-to-Device (D2D) signal used by the wireless device for D2D operation, wherein the D2D signal comprises a physical resource for a D2D control or data transmission other than a physical Device-to-Device Synchronization Signal (D2DSS);

determine a power difference between the measured power of the D2D signal and a physical D2DSS [Device to Device Synchronization (D2DSS)]; estimate power of a D2DSS using the measured power of the D2D signal and the determined power difference; and perform a D2D operation using the estimated power of the D2DSS.

12. The wireless device of claim 11, wherein the D2D signal comprises a signal of a Physical Device-to-Device Shared Channel (PD2DSCH).

13. The wireless device of claim 12, wherein the signal of the PD2DSCH is a Demodulation Reference Signal (DMRS).

14. The wireless device of claim 12, wherein the signal of the PD2DSCH is a physical resource.

15. The wireless device of claim 11, wherein the D2D signal is a DMRS for a Scheduling Assignment (SA) or a DMRS for a D2D data transmission.

16. The wireless device of claim 11, wherein the D2D signal is a physical resource for a SA or a physical resource for a D2D data transmission.

17. The wireless device of claim 15, wherein the processor is further operable to disable open-loop power control for the SA and the D2D data transmission.

18. The wireless device of claim 11, wherein the processor operable to determine a power difference between the measured power of the D2D signal and the D2DSS is operable to determine a power difference between a DMRS for a PD2DSCH and the physical D2DSS.

19. A wireless device comprising a processor operable to:

identify a set of wireless devices performing Device-to-Device (D2D) data communication or D2D discovery;

identify a set of Device-to-Device Synchronization Signals (D2DSS) transmitted by the identified wireless devices performing D2D data communication or D2D discovery;

measure power of a D2DSS from the identified set of D2DSS; and perform a D2D operation using the measured power of the D2DSS;

wherein:

the processor operable to identify the set of wireless devices performing D2D data communication or D2D discovery is operable to:

measure a power level of a plurality of Device-to-Device Shared Channel (D2DSCH) resources; and determine, using the measured power level of the plurality of D2DSCH resources, whether a wireless device associated with each of the plurality of D2DSCH resources is performing D2D data communication or D2D discovery; and the processor operable to identify the set of D2DSS transmitted by the identified wireless devices performing D2D data communication or D2D discovery is operable to identify a D2DSS paired with each of the PD2DSCH determined to be associated with a wireless device performing D2D data communication or D2D discovery.

20. A wireless device comprising a processor operable to:

identify a set of wireless devices performing Device-to-Device (D2D) data communication or D2D discovery;

identify a set of Device-to-Device Synchronization Signals (D2DSS) transmitted by the identified wireless devices performing D2D data communication or D2D discovery;

measure power of a D2DSS from the identified set of D2DSS; and perform a D2D operation using the measured power of the D2DSS;

wherein:

the processor operable to identify the set of wireless devices performing D2D data communication or D2D discovery is operable to:

measure a power level of a plurality of D2DSS resources; and determine, using a statistical distribution of the measured power level of the plurality of D2DSS resources, whether a wireless device associated with each of the plurality of D2DSS resources is performing D2D data communication or D2D discovery.

* * * * *

UNITED STATES PATENT AND TRADEMARK OFFICE
CERTIFICATE OF CORRECTION

PATENT NO. : 9,736,798 B2
APPLICATION NO. : 14/893135
DATED : August 15, 2017
INVENTOR(S) : Sorrentino et al.

It is certified that error appears in the above-identified patent and that said Letters Patent is hereby corrected as shown below:

In the Specification

In Column 3, Line 23, delete "cell" and insert -- cell-specific --, therefor.

In Column 6, Line 67, delete "multi-input multi-output" and insert -- multiple-input multiple-output --, therefor.

In Column 12, Line 57, delete "type" and insert -- type communications --, therefor.

In Column 16, Line 4, delete "PSBCH" and insert -- PSDCH --, therefor.

In the Claims

In Column 16, Lines 33-34, in Claim 1, delete "D2DSS [Device to Device Synchronization (D2DSS)];" and insert -- D2DSS; --, therefor.

In Column 17, Lines 54-55, in Claim 11, delete "D2DSS [Device to Device Synchronization (D2DSS)]; estimate" and insert -- D2DSS; --, therefor.

In Column 17, Line 56, in Claim 11, delete "power" and insert -- estimate power --, therefor.

Signed and Sealed this
Seventh Day of November, 2017

Joseph Matal
*Performing the Functions and Duties of the
Under Secretary of Commerce for Intellectual Property and
Director of the United States Patent and Trademark Office*